(12) United States Patent
Sompolski et al.

(10) Patent No.: US 11,232,103 B2
(45) Date of Patent: Jan. 25, 2022

(54) SYSTEM AND METHOD USING PARTIAL JUST-IN-TIME COMPILATION TO RESOLVE MEMORY ACCESS PATTERN PROBLEMS IN HASH TABLE PROBING

(71) Applicant: ACTIAN NETHERLANDS, B.V., Amsterdam (NL)

(72) Inventors: Juliusz Sompolski, Amsterdam (NL); Marcin Zukowski, Amsterdam (NL); Peter Boncz, Amsterdam (NL)

(73) Assignee: ACTIAN NETHERLANDS, B.V., Amsterdam (NL)

( * ) Notice: Subject to any disclaimer, the term of this patent is extended or adjusted under 35 U.S.C. 154(b) by 198 days.

(21) Appl. No.: 16/049,718

(22) Filed: Jul. 30, 2018

(65) Prior Publication Data

US 2019/0197039 A1 Jun. 27, 2019

Related U.S. Application Data

(63) Continuation of application No. 13/562,135, filed on Jul. 30, 2012, now abandoned.

(60) Provisional application No. 61/658,349, filed on Jun. 11, 2012.

(51) Int. Cl.
*G06F 16/2453* (2019.01)

(52) U.S. Cl.
CPC .............................. *G06F 16/24544* (2019.01)

(58) Field of Classification Search
None
See application file for complete search history.

(56) References Cited

U.S. PATENT DOCUMENTS

| | | | |
|---|---|---|---|
| 6,317,796 B1* | 11/2001 | Bak | G06F 9/4491 719/315 |
| 2002/0029357 A1* | 3/2002 | Charnell | G06F 9/4491 714/5.11 |
| 2004/0133777 A1* | 7/2004 | Kiriansky | G06F 21/53 713/166 |
| 2012/0304159 A1* | 11/2012 | Ceze | G06F 8/31 717/140 |

* cited by examiner

*Primary Examiner* — James Trujillo
*Assistant Examiner* — Kurt A Mueller
(74) *Attorney, Agent, or Firm* — Arent Fox LLP

(57) ABSTRACT

A system and method for just in time compilation for hash table probing are disclosed. In one implementation, the method of using just-in-time compilation is used to combine the stages of hash value computation and initial lookup into a single compound operation. In another implementation, the method of using just-in-time compilation is used to combine the stages of a hash table record and input record checking to detect if these records are equal, and if not, fetching the next possible record in the linked list of the per-bucket records.

14 Claims, 10 Drawing Sheets

```
pos = B[hash_keys(probe_keys)]
if (pos) {
    do { // pos == 0 reserved for miss.
        if (keys_equal(probe_keys, V[pos].keys)) {
            fetch_value_columns(V[pos]);
            break; // match
        }
    } while(pos = next in chain); // collision or miss
}
```

SYSTEM AND METHOD USING PARTIAL JUST-IN-TIME COMPILATION TO RESOLVE MEMORY ACCESS PATTERN PROBLEMS IN HASH TABLE PROBING

PRIORITY CLAIMS/RELATED APPLICATIONS

This patent application is a continuation of U.S. patent application Ser. No. 13/562,135, filed Jul. 30, 2012, which claims the benefit under 35 USC 119(e) and 120 to U.S. Patent Application Ser. No. 61/658,349, filed on Jun. 11, 2012 and entitled "System And Method Using Partial Just-In-Time Compilation To Resolve Memory Access Pattern Problems In Hash Table Probing", the entirety of which is incorporated herein by reference.

FIELD

The field relates generally to a database system and in particular to a system and method for resolving memory access pattern problems in hash table probing.

Background

A hash join is one of the most often used joining algorithms in database kernels. Consider an example SQL query involving a join of two tables:

SELECT tabA.col1, tabA.col2, tabA.col3, tabB.col1, tabB.col2, tabB.col3.

FROM tabA JOIN tabB ON tabA.b_pkey=tabB.pkey AND tabA.b_subkey=tabB.subkey;

If the query optimizer decides that the join is to be performed using a HashJoin operator, the operator builds a hash table indexed on the join keys of one ("build") input (tabA.b_pkey, tabA.b_subkey, assuming tabA is a build input), and then probes the hash table with the join keys from the second ("probe") input (tabB.pkey, tabB.subkey, assuming tabB is probe input), fetching the requested build input columns (tabA.col1, tabA.col2 and tabA.col3).

Depending on the query, the sets of build input join keys, probe input join keys and fetched columns change. The Hash Join needs to handle all of the following combinations:

be able to hash the given set of join keys,
be able to compare the given set of join keys,
be able to fetch the fetch columns into output.

Most database management systems (DBMS) achieve this by putting together basic ("primitive") operations, depending on the types and quantity of involved columns. There would be a separate operation for hashing each column, comparing each column and often also for fetching each column. In database engines that process row-wise records, the latter operation can sometimes also be achieved by copying the whole group of columns into a segment of a result row, but the width and offset of the fetched segment is still dynamic. Most database systems would process this one record, known as a "tuple" or "row" at a time. Calling each of the connected ("interpreted") primitive operations together for every single record incurs a significant processing and memory access overhead.

Some systems, such as the commercially available Vectorwise system, reduce this overhead by amortizing the interpretation across multiple database records. Instead of processing one record, a "vector" of records is processed at once ("vectorized"). M. Zukowski, "Balancing Vectorized Query Execution with Bandwidth-Optimized Storage", Ph.D. Thesis, Universiteit van Amsterdam (September 2009) (hereinafter "Zukowski Thesis"), incorporated herein by reference, introduced in Section 5.3.3 an algorithm for processing a vector of probe keys and outputting a vector of result records in one step, hence reducing the interpretation overhead.

The vectorized model described above is a specific implementation of a broader "block-oriented" processing model in which multiple records are passed between Operator objects in one pass. Different variants of the "block-oriented" processing model are possible, for example, a variant in which the data is passed between Operators not as a "collection of vectors" but as "an array of records". As long as "block-oriented" hash table processing is used in a form equivalent to described below, these different variants will suffer from the same data access problems.

In the vectorized approach, each of the primitive operations is performed on a vector of records at a time. This greatly improves performance, and, as in such cases, reveals new bottlenecks. During hash table probing, there are random (hash value driven) accesses to huge arrays in memory, where the hash table is stored. A vectorized operation would perform a primitive operation on a number of records on scattered positions in the hash table. If the hash table is big, these operations would access memory from different memory pages, whose virtual memory addresses need to be translated into physical memory addresses by the memory management hardware using a known Translation Lookaside Buffer (TLB). The results of TLB translations are cached, but since TLB caches are small, by the time the last record of the vector is processed, the translation of the location of the records from the beginning of the vector would already have been evicted from the TLB cache. Another vectorized operation that performs a primitive operation on the same vector of records (e.g. a comparison on another join key and fetch of another column) would again want to start from the beginning of the vector, and cause a TLB miss on data that has just been accessed. This access pattern causes a lot of TLB misses. Additionally, CPU-cache misses can also occur. When memory is accessed using a granularity of cache-lines, and if the number of records accessed by a given vectorized operation is larger than the capacity of the CPU-cache hierarchy, the next vectorized operation might incur CPU-cache misses.

The record-at-a-time approach used by most DBMS do not encounter this problem since, when processing one record at a time, it accesses just one memory location and there is no place for TLB trashing and CPU-cache misses described above. The vectorized algorithm described above, however, shows great improvements over the record-at-a-time interpreted approach despite the clearly non-optimal memory access pattern with respect to the TLB and CPU-cache.

The record-at-a-time approach also has other less obvious drawbacks because processing just one record means that there is no place for out-of-order execution from the hardware. In other words, when a record-at-a-time algorithm processes one record, it needs to wait while the record is being accessed. Modern hardware memory management systems can only fully exploit memory bandwidth if many memory accesses can be made in parallel. The vectorized algorithm performs independent operations on multiple records and they are performed in a loop, and the out-of-order execution capabilities of modern hardware allow efficient prefetching of data from independent records.

Thus, it is desirable to overcome the TLB trashing and CPU-cache misses that might occur in a vector-at-a-time database for a hash table probing and it is to this end that the disclosure is directed.

BRIEF DESCRIPTION OF THE DRAWINGS

FIG. 10 illustrates an example source code of the compound operations generated by the method.

DETAILED DESCRIPTION OF ONE OR MORE EMBODIMENTS

The disclosure is particularly applicable to the Vectorwise database system product that is commercially offered by Actian Corporation and it is in this context that the disclosure will be described. It will be appreciated, however, that the described hash table probing system and method has greater utility since it can be used with other block processing systems including systems that use a vectorized approach.

The system and method use just-in-time compilation to generate new vectorized primitive operations that combine the basic vectorized primitive operations. The just-in-time compiled vectorized combined primitive allows the database system to be able to perform multiple operations on a record from one location at once while avoiding having to access the record multiple times. As a result, the just-in-time compiled vectorized combined primitive does not cause the unnecessary TLB and CPU-cache misses. At the same time, creating the vectorized combined primitive using just-in-time compilation keeps the advantages of vectorized approach—independent operations on multiple records that allow better memory prefetching and CPU pipelining.

Figure 1:
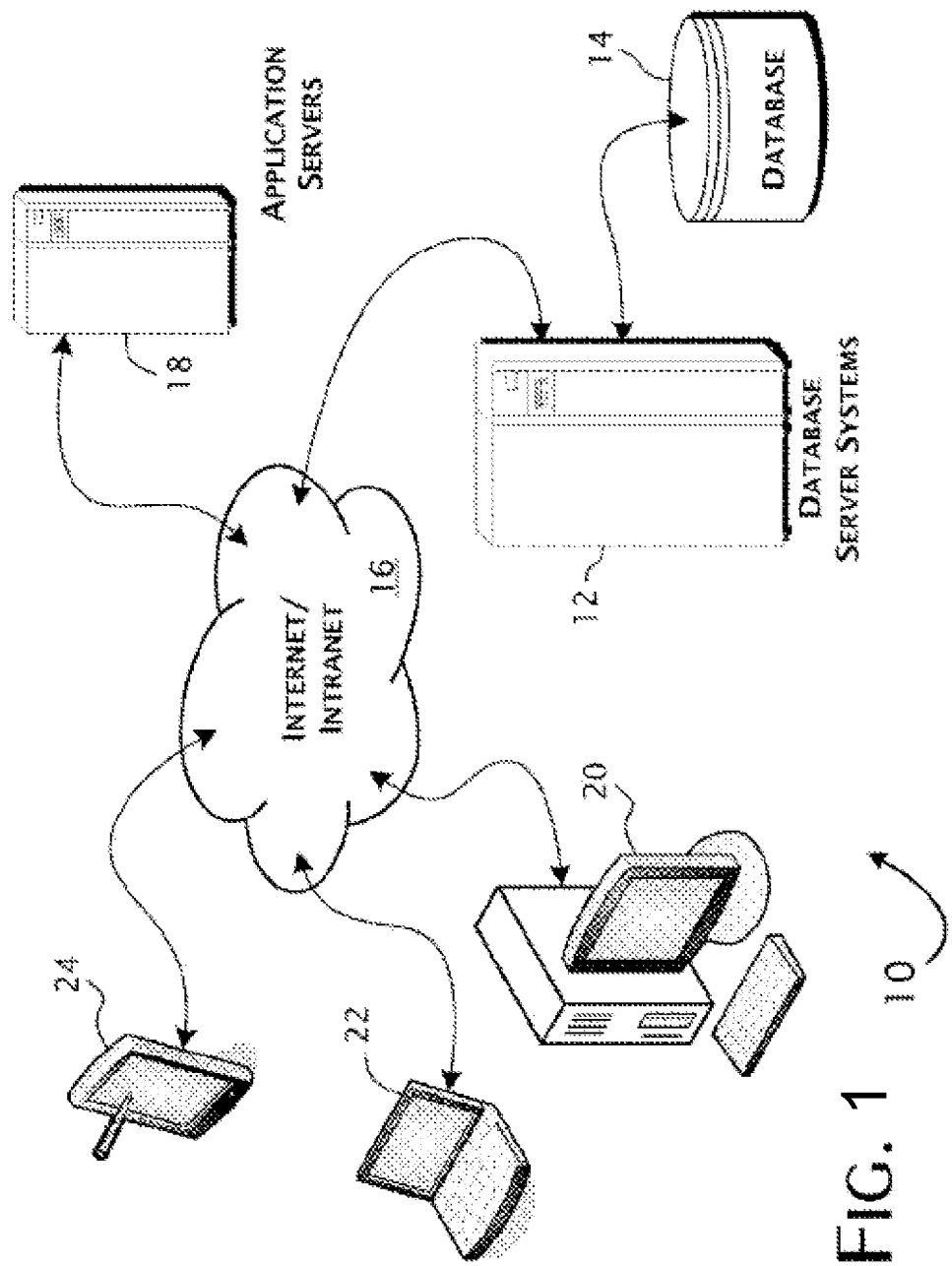
FIG. 1 is a system diagram illustrating an implementation of an operating environment of a database system.

FIG. 1 is a system diagram illustrating an implementation of an operating environment 10 of a database system. In the environment, one or more database server systems 12 host, directly or indirectly, a storage device 14, such as for example a database. Access requests are typically received over a wired or wireless link 16, such as for example, the Internet and intranet or other networks, from various sources such as for example one or more application servers 18 that are each executing on-line transaction processing (OLTP) applications. The specific operations of the OLTP applications are typically directed by or executed in support of requests from one or more computing units, such as for example, client applications executed on client computers 20 of various types including mobile computers 22 and communications devices 24. Each computing unit may be a processing unit based device with sufficient processing power, memory and connectivity to interact with the database server system 12. For example, each computing device may be a smartphone (Apple iPhone, RIM Blackberry, Android based devices), a personal computer, a tablet computer and the like.

Figure 2:
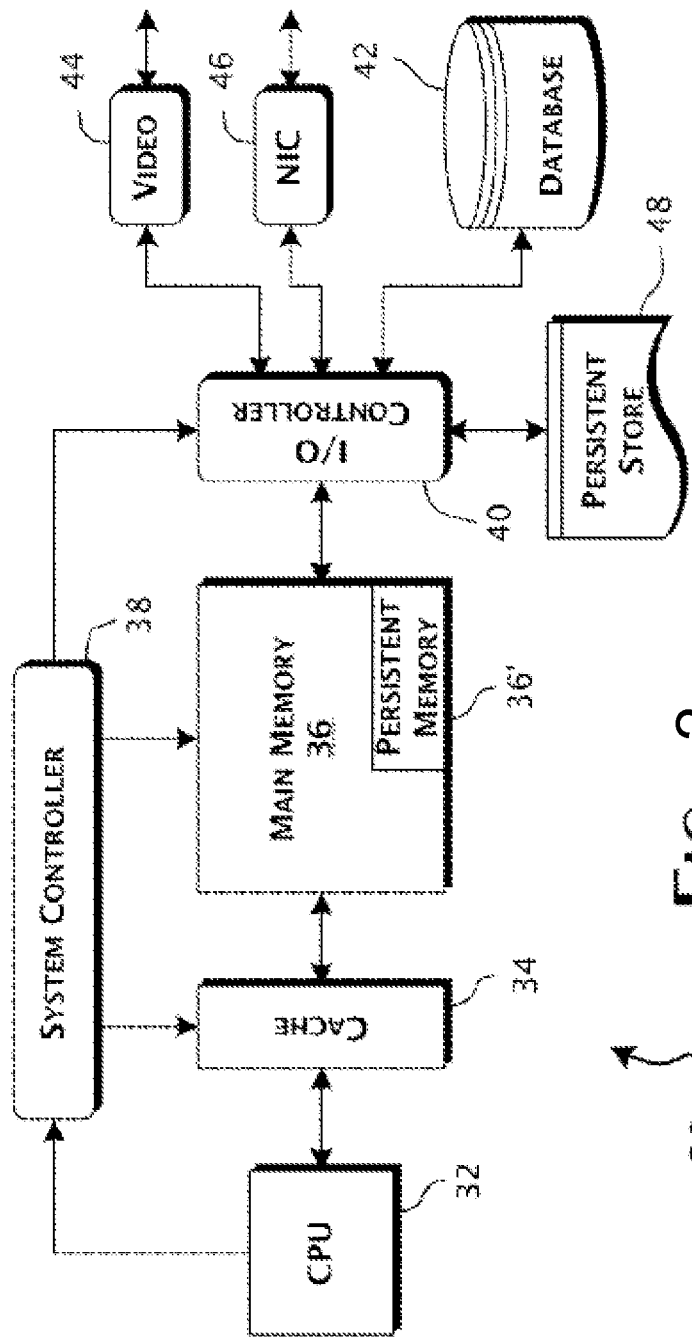
FIG. 2 is a simplified block diagram of an implementation of a computer database system.

FIG. 2 is a simplified block diagram of an implementation of a computer database system 30 for the database system 12 that may implement the automatic vertical table decomposition process. The database system 30 may include one or more central processing unit (CPU) subsystem 32, implemented for example as a multi-core, multiprocessor subsystem, includes some combination of in-core and close coupled cache subsystem 34 connected to a main memory store 36. In typical embodiments, the cache subsystem 34 will range from 2 to 32 megabytes per core with typically additional, larger cache layers shared among the cores within the CPU subsystem 32 and the main memory 36 will be substantially larger. A portion 36' of the main memory store 36 may be implemented to be persistent memory so that the data is maintained even when power is removed, such as by using Flash memory or a conventional backup battery solution. A system controller 38 manages data transfers between the central processing subsystem 32, cache 34, and main memory 36 subsystems through one or more input/output (I/O) controllers 40 that connect, directly or indirectly, to a physical database 42, and I/O devices, including typically a video controller 44 and network interface controller 46. A high-access rate persistent store 48, utilizing a high-performance magnetic or Flash emulation disk, may also be provided.

As described above, the database system has a TLB and TLB cache that translate addresses and cache data retrieved from memory, respectively. The TLB and TLB cache are known and described in more detail in Zukowski Thesis at Section 2.2 and J. Sompolski, "Just-in-time Compilation in Vectorized Query Execution," Master thesis (August 2011) (hereinafter "Sompolski Thesis") which is incorporated herein by reference, at Section 2.3.6.

Figure 3:
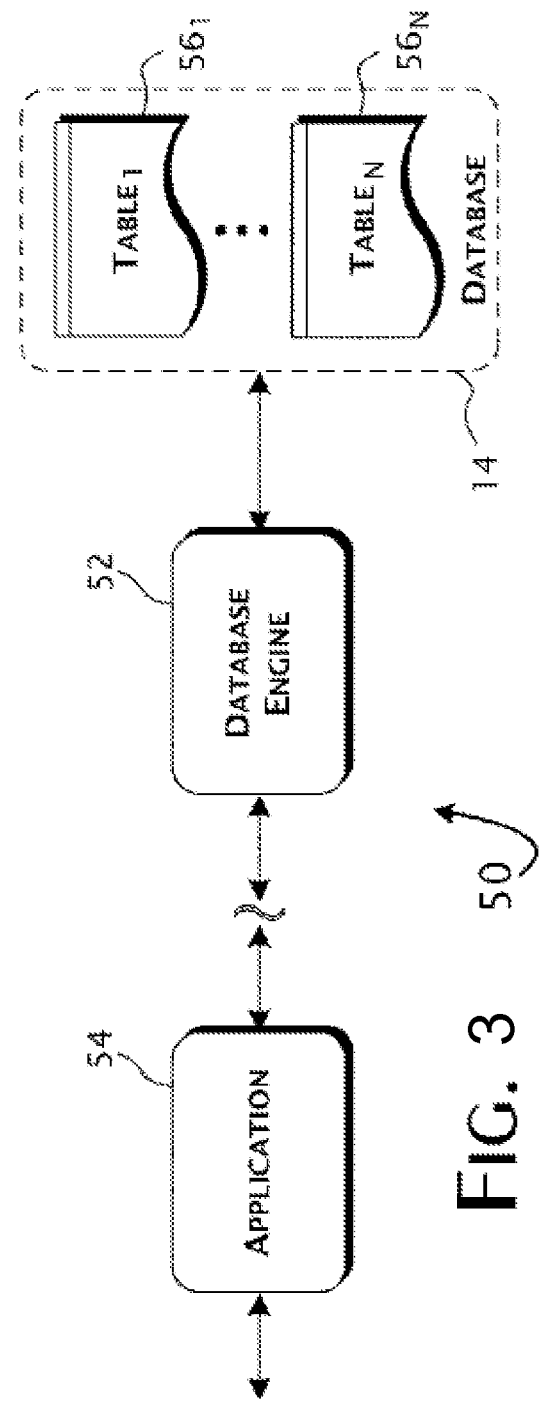
FIG. 3 is a block diagram illustrating a preferred tiered implementation of the database system.

FIG. 3 is a block diagram illustrating a preferred tiered implementation of the database system execution environment 50 that is implemented in or as part of a database engine 52. Database read and update requests are received from one or more applications 54 and satisfied by access to a database 14 containing one or more data tables, such as $56_1, \ldots, 56_N$ as shown in FIG. 3. The one or more applications 54 may be executed local or remote with respect to the database engine 52. The database 14 may be implemented as a physical storage device 42 connected directly to a database server system 12 that executes the database engine 52 or remotely through storage area network (SAN) or other distributed data storage system.

The above database system, including the database engine 52, may implement a just in time primitive compilation and hash table probing using a vectorized approach. In this approach, a user query is being executed in a DBMS system by means of a graph of communicating "Operator" objects (e.g. Scan, Select, HashJoin). The Operator objects exchange the data by means of Vectors, where each Vector is a simple array of values representing a subset of a single attribute from a relational table, or of intermediate query result. The Operator objects provide a generic operator logic, and perform actual data processing by means of specialized "Primitive" functions. Each Primitive is a function providing a specific functionality (e.g. addition) for specific types of input (e.g. integer values). More details on the vectorized approach to data processing are available in the Zukowski Thesis at Chapters 4 and 5. The just in time primitive compilation and hash table probing using a vectorized approach may be implemented in hardware and interact with a database server or DBMS, but may also be implemented in software and be part of the database engine 52 or database management system (DBMS) that executes on the database servers of the database system. The DBMS system above can be used for vectorized processing. The hash table probing method, that will now be described in more detail, can be implemented on the database system, engine and DBMS in FIG. 1-3.

Figure 4:
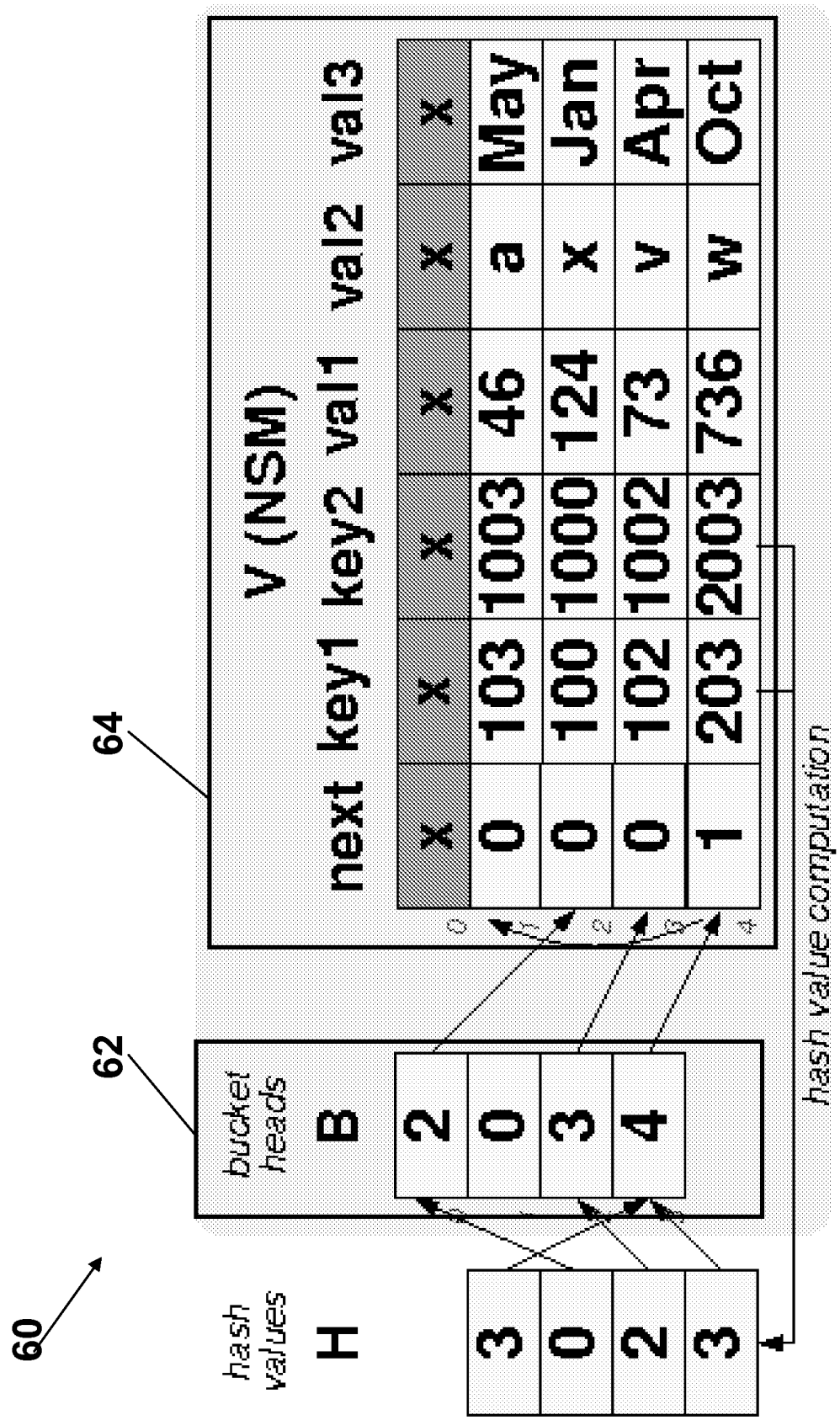
FIG. 4 illustrates an example of a hash table data structure.

FIG. 4 illustrates an example of a hash table data structure 60 that can be probed using the vectorized hash table probing method and system. In the usual vectorized approach, bucket chaining is used for the hash table. This means that keys are hashed into buckets in a bucket array B 62, whose size "N" is a power of two. The bucket contains an offset of a tuple in a value space V 64, which is the head of a linked list of records associated with the given hash.

The value space V 64 is organized in a NSM (Normalised Standard Model) layout, which is: attributes from the same record are together in memory; "row-wise". The value space V contains the key and fetch columns of the build relation, as well as a next-offset, which implements the linked list. The value space is therefore one big array of records in NSM. A bucket may have a chain of length greater than one either due to hash collisions, or because there are multiple records in the build relation with the same keys.

Figure 5:
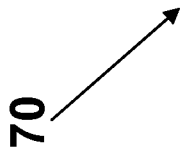
FIG. 5 shows pseudocode for a base hash table probing method.

FIG. 5 shows pseudocode for a base hash table probing method 70. Using the method, the probe keys will first be hashed together to find an index in the bucket array B, which points to the head of the linked list in value space V as shown in FIG. 4. Then, a method loops and progresses through the list, performing comparisons of the probe keys with the keys retrieved from the hash table. In case of a match, the method fetches the value attributes (See fetch_value_columns(V[pos]) instruction in the pseudocode). The functions hash_keys, keys_equal and fetch_value_columns in the pseudocode are complicated routines that must work for different types of attributes and numbers of attributes. In most database systems, these functions would be an interpreted combination of basic functions each working on one value of one record at a time. In current just-in-time compilation systems, the above method would be compiled as-is, embedding the correct hashing, comparing and fetching functions in the compiled code.

Figure 6:
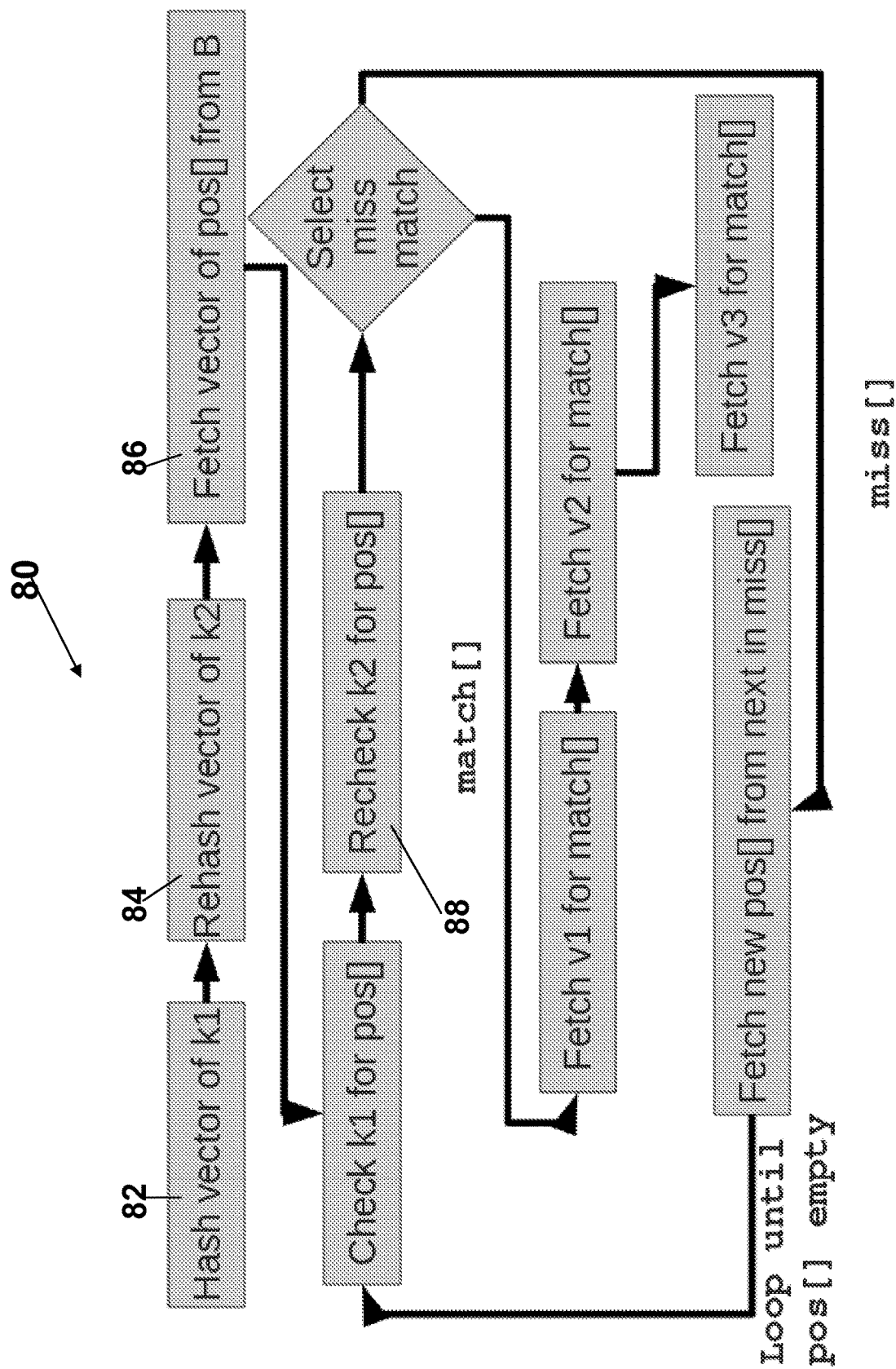
FIG. 6 illustrates a vectorized database process.

FIG. 6 illustrates a vectorized database process 80 that may be implemented, for example, in the commercially available Vectorwise product offered by Actian Corporation. The vectorized method is described in detail in the Zukowski Thesis that is already incorporated by reference and in particular in Section 5.3.3. A block diagram for a query involving two key attributes and three fetch attributes is shown in FIG. 6 and would involve:

SELECT build.v1, build.v2, build.v3
WHERE probe.k1=build.k1 AND probe.k2=build.k2
FROM probe, build;

In FIG. 6, each of the blocks is a basic operation (primitive). Each of the operations processes a vector of records. Each arrow represents a connection that has to be constructed to create the interpreted execution tree. The method follows the general flow of the base method described in FIG. 5 and above, with the difference being that it processes a vector of records, instead of one.

In the method, probing starts by vectorized computation of a hash number and bucket number (82,84). The hash and rehash primitives compute hash values based on the set of probe key attributes. A bitwise-and primitive is used to compute a bucket number from the hash values: H&(N-1). These operations are performed on a vector of records, so the process ends up with a vector of positions in the buckets array B, from which the method can fetch a vector of the positions of the heads of linked-lists for the calculated buckets in the value space V into a vector pos[ ] (86), and create a "selection vector" match[ ], which in turn points to positions in pos[ ] for which the linked list was not empty. If the value (offset) in the B was 0, there is no key in the hash table—these tuples store 0 in pos[ ] and are not part of match[ ].

Having identified the positions of possible matching tuples, the next task is to "check" if the key values actually match. This is needed as multiple different records can be hashed onto the same entry in the bucket array B. This check is implemented using a specialized primitive that combines fetching a value from the given offset of value space V with testing for non-equality. Similar to hashing, multi-attribute keys are supported using a recheck primitive 88. The resulting boolean map mark positions for which the check failed. Then the positions from pos[ ] for which the check was successful can be saved into (overwrite) match[ ], and those for which the check failed written into miss[ ].

For those positions that went into the match[ ] vector, the method successfully found a match in the hash table, and can use the fetch primitives to fetch the output attributes into result vectors. For those positions that went into the miss[ ] vector, the method should advance to the next element of the linked list. Moving on in the linked lists is done by a primitive which for each record from miss[ ] indexes in pos[ ], fills new pos[ ] with the next position in the linked-list, and new match[ ] with the positions in pos[ ] on which we still follow the linked list. The loop finishes when the match[ ] vector becomes empty, so there are no more linked lists to follow.

Each of the check, recheck, fetch operations in the method accesses the same positions pos[ ] in value space V, but by the time of next access to the same position by a different operation, the virtual-to-physical memory translation of a particular position is evicted from the TLB cache and possibly CPU-cache. As a result, CPU-cache miss and TLB trashing occurs with the above method. On the other hand, the vectorized method processes a vector of independent records and operations on different records are independent. Furthermore, even though there is no explicit parallelism, the basic operations are very short and simple loops with independent bodies, the processor can detect that and execute out of order, issuing overlapping random memory accesses. The needed values from records from different positions in pos[ ] thus will be prefetched in parallel utilizing the full memory bandwidth.

Figure 7:
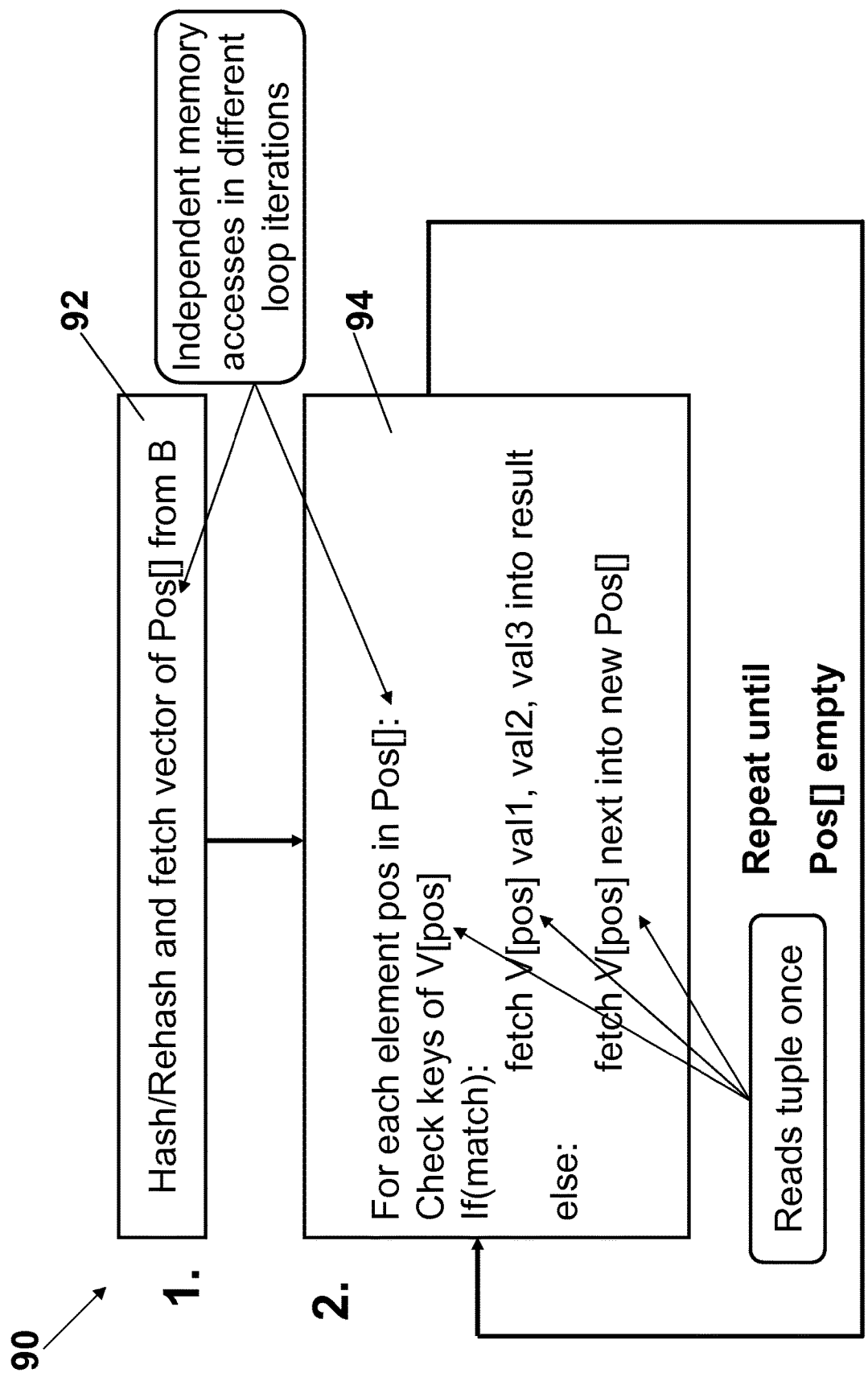
FIG. 7 illustrates a vectorized database process with a hash probing process.

FIG. 7 illustrates a vectorized database process 90 with a hash probing process, where basic vectorized operations from FIG. 6 are combined using just-in-time compilation. The method: 1) combines basic operations that perform subsequent manipulations on data from the same tuple to avoid expensive re-fetching of the tuple; and 2) when tuples from new positions have to be accessed, it is always done for a whole vector of positions so that multiple memory accesses can be executed at once from independent iterations. In the method, the primitive operations from the Vectorwise method described above are used for generating source code for the compound functions (with the multiple operations) that can be compiled into a single machine code function and dynamically linked with the database server.

The first compiled compound function/operation has the full sequence of hash/rehash/bitwise-and and initial lookup operations (92). The retrieval of the linked-lists heads positions into pos[ ] from B requires random memory accesses to the buckets array B. The method interleaves the retrieval with more computations to hide the latency of this memory access, especially when the match percentage is high.

The second compiled compound operation (94) combines all operations that can be done on a single tuple in the hash table after it is accessed which means, at most, one TLB miss compared to one miss per attribute in the vectorized implementation. Therefore, check and iterative re-check are combined. Then, if the check was successful, fetching the values into result vectors is performed at once. If not, the position of the next tuple in the bucket chain is saved in the pos[ ] vector.

Advancing to the next tuples in the linked-lists to generate a new pos[ ] vector is left to be done with vector granularity to benefit from independent memory accesses that help fill the memory bandwidth. Further details of the method are described in Sompolski Thesis.

In summary, the system and method optimizes the hash table lookup in which the hash table has an entry bucket array and for each entry bucket there is a linked-list structure of possible hits for that entry bucket. The lookup process consists of the following phases: (1) a hash value and the bucket number are computed (hash value computation); (2) the hash table is checked for the existence of a linked list associated with a given bucket (initial lookup); (3) for non-empty lists the key values in the looked-up record are checked with the values in the records stored in this linked list (checking); (4a) for tuples that do not match, the next tuple in the linked list is found (fetching next); (4b) for tuples that do match, the record values from the hash table are fetched (fetching values). In the system and method of the disclosure, the system processes hash table lookups for multiple records by decomposing many short per-element loops for each elements into few separate long loops for each stage of processing, where each such loop performs that stage for all input (or still active) records.

Figure 10:
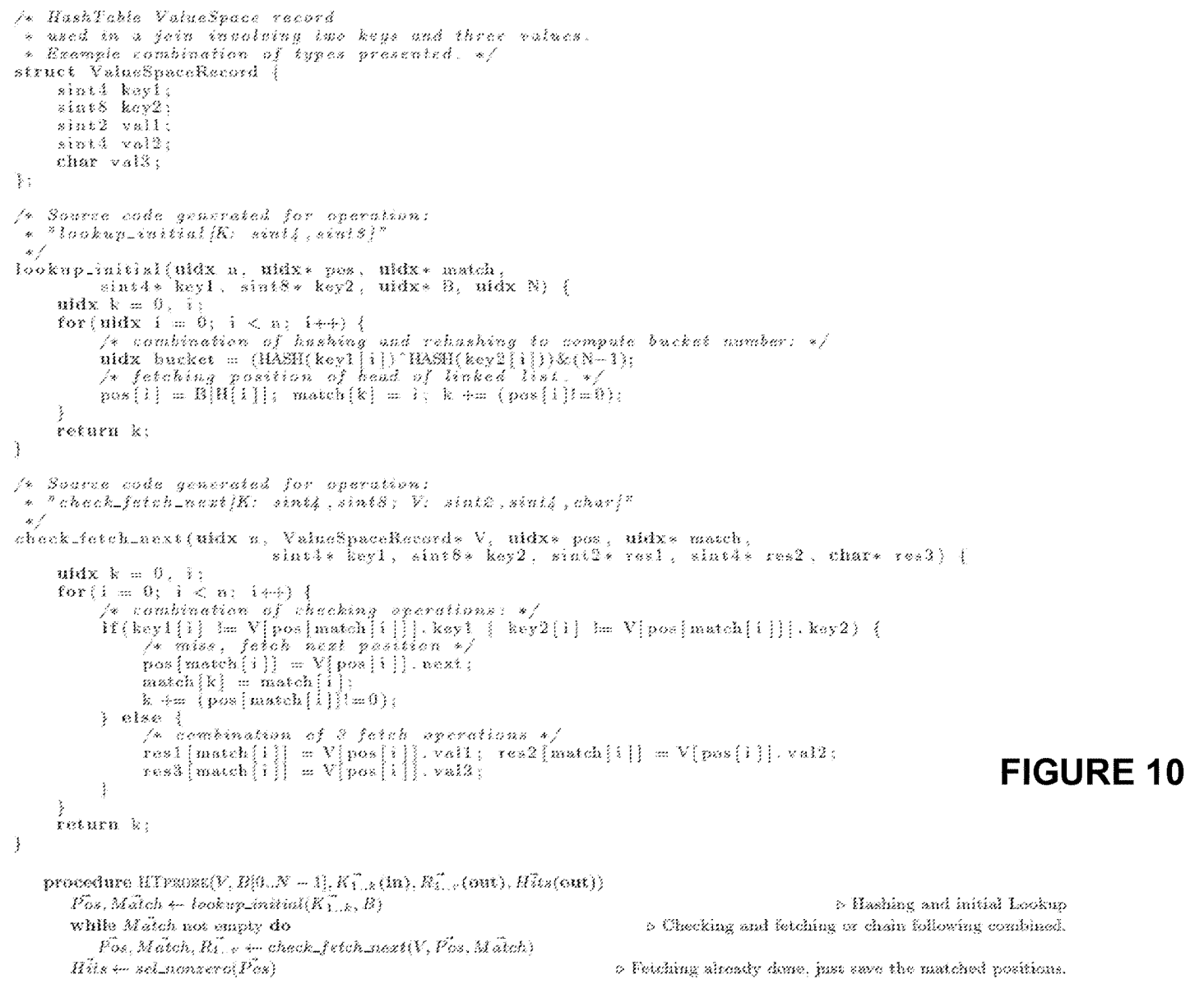

FIG. 10 shows the generated source code for the compound operations for the example with two keys and three fetched attributes, and an example combination of their types. The generated source code is compiled using just-in-time compilation techniques, and the resulting machine code is dynamically linked into the database server (the method of performing just-in-time compilation and dynamic linking is not the object of this patent) and used in the query. The compiled compound operations are stored in the system, with names that uniquely define their function: "lookup_initial[K: sint4,sint8]" and "check_fetch_next[K: sint4,sint8; V: sint2,sint4,char]". The "lookup_initial[K: sint4,sint8]" function can be reused in any other query, that involves a join on two keys of types sint4 and sint8, without having to repeat source code generation and just-in-time compilation. The same applies to "check_fetch_next[K: sint4,sint8; V: sint2,sint4,char]" function, if another join is performed with the same layout of the ValueSpaceRecord structure—in any other query that involves a join on two keys of types sint4 and sint8 and fetching of two attributes of sint2, sint4 and char. This provides significant potential of function reuse between queries. Even though there may be many different queries in a given database schema and workload, the same joins will be repeating in many of them. The repeating joins are a sufficient condition for reuse in our method, while other systems that use just-in-time compilation to compile queries as a whole can reuse generated code only for entire queries having exactly the same structure.

In one aspect, the system and method provide just-in-time (on-the-fly) compilation to combine the stages of hash value computation and initial lookup into a single compound operation which reduces TLB trashing. In another aspect, the system and method use just-in-time (on-the-fly) compilation to combine the stages of a hash table record and input record checking, detecting if these records are equal, and if not, fetching the next possible record in the linked list of the per-bucket records. In yet another aspect, the system and method has compound primitive that additionally perform fetching of the attribute values (key or non-key) for records where comparison yields true. In yet another aspect, the system and method stores generated compound primitives, identified by the types of the input records, and reuses them for the next occurrence of the hash table lookup with the same combination of input types.

Typical systems that use just in time compilation to compile entire queries provide limited potential of re-using the generated code: it is possible only if the exact same query (or query with an identical structure but different parameters) is used again. Presented system and method compiles smaller fragments (the compound generated primitives) so that there is more opportunity to reuse the compiled code. When the smaller fragments are compiled and buffered, the compiled code can be reused if the set of data types of keys and set of data types of fetched value attributes of a particular join is the same. On a given database schema, keys on which the system joins tables and attributes that the system fetches from dimension tables often repeat, so there is a big chance that the server running on a given schema will be able to buffer JIT-compiled functions for all commonly executed joins. Thus, instead of being able to reuse only for the same queries, the system can reuse the JIT compiled code for queries that have joins of the same database tables.

Figure 8:
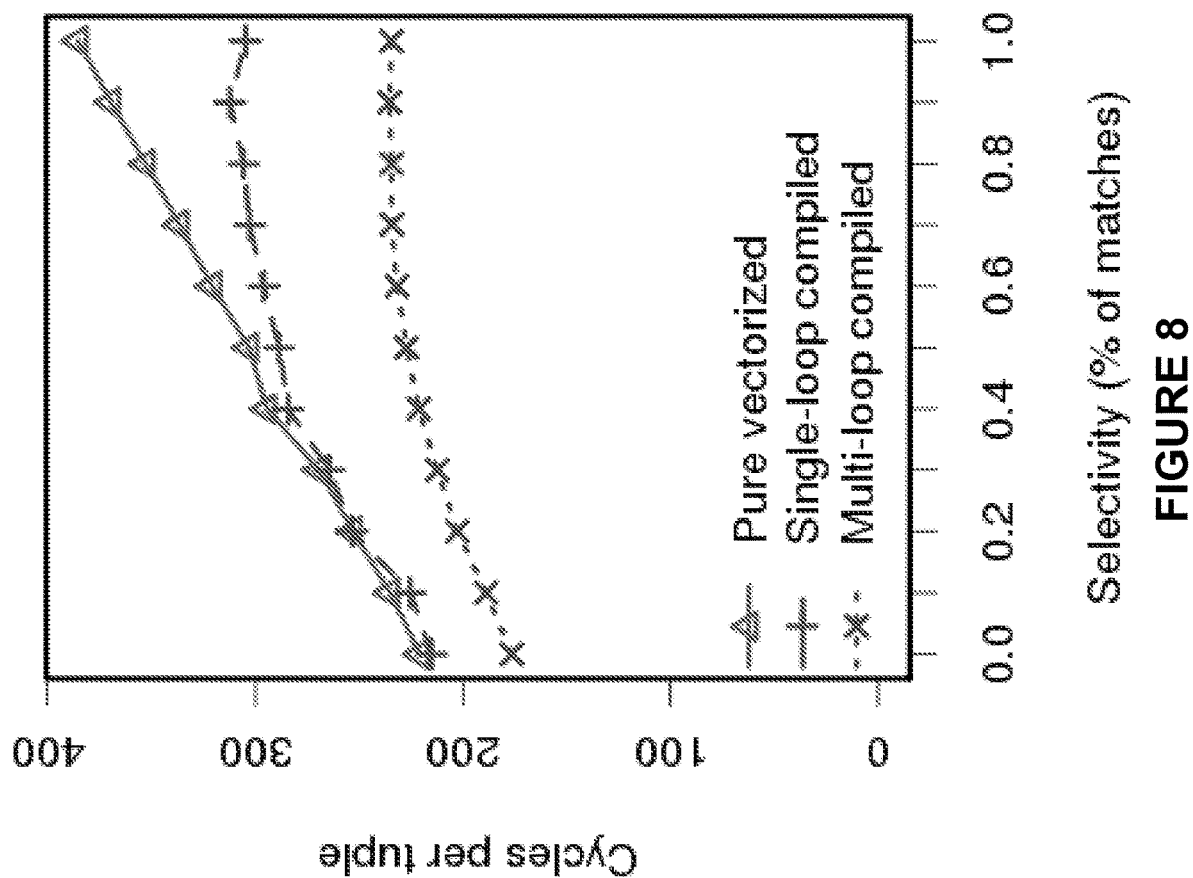
FIGS. 8 and 9 illustrate performance results of the hash probing method compared to existing systems.
Figure 9:
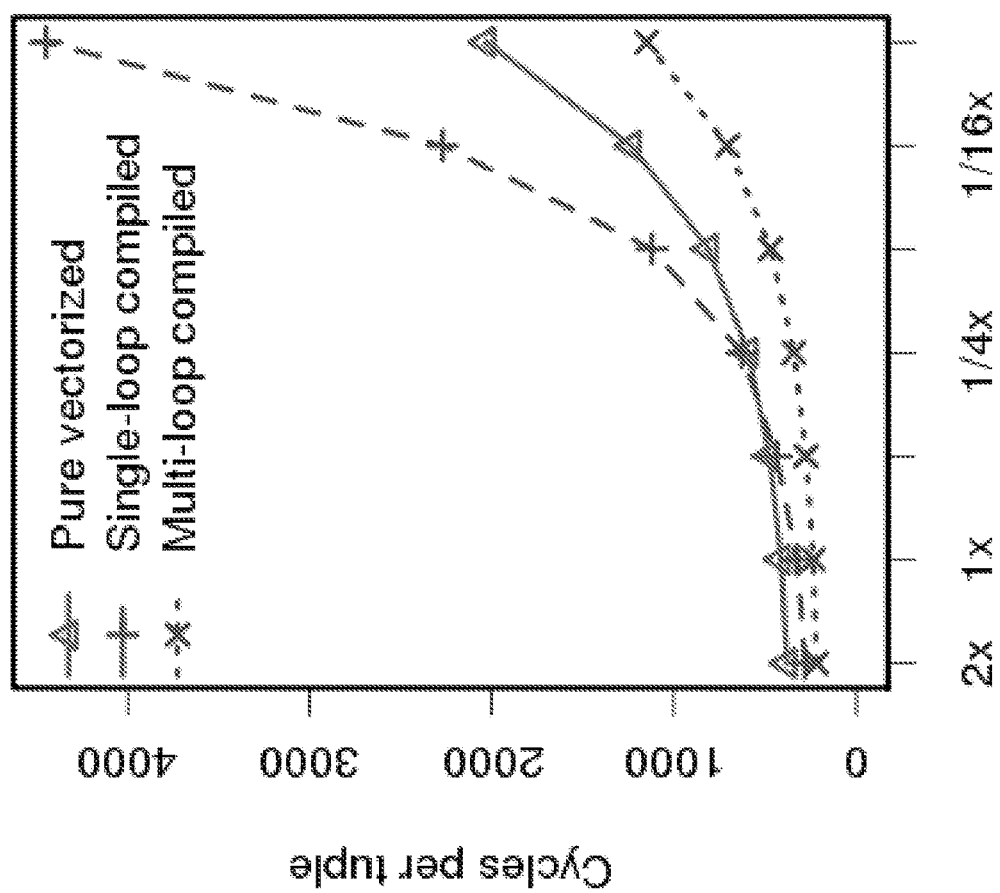

FIGS. 8 and 9 illustrate performance results of the hash probing method compared to existing systems. These results are benchmarks that were conducted that compare the above system to the vectorized method and a record-at-a-time just-in-time compiled method using the following query:

SELECT build.col1, build.col2, build.col3
WHERE    probe.key1=build.key1    AND
    probe.key2=build.key2
FROM probe, build;

This query emphasizes the disadvantages of a vectorized approach since it involves multiple columns. There were 16 million records in the build relation, a size big enough to expect every random record access to be requiring TLB translation of a different memory page, again putting the vectorized approach in a worse position. The three implementations were tested in two experiments:

1. Results from FIG. 8, "Selectivity (% of matches)": In a real-life scenario, changing match-ratio of the hash probing.

2. Results from FIG. 9, "Number of buckets/hash table size": In an artificial scenario, artificially tuning the hash table to increase the number of hash collisions. This experiment was conducted to show the main deficiency of the prior record-at-a-time solutions which suffer from dependencies in case of collisions. Of course, a correctly tuned hash table should not have many hash collisions. Still, such behavior is possible e.g. due to a skew in the DBMS hash function.

The results of both experiments show that the vectorized approach is comparable to the single-loop compiled approach, but that the system and method is better than both by a wide margin on the full range of parameters.

As shown in FIGS. 8 and 9, the system and method described above has advantages over both the vectorized approach and the single-loop just in time compiled approach.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. An apparatus for hash table lookups in a block oriented processing system, the apparatus comprising:
   a database that performs block oriented processing;
   the database having a database engine that just in time compiles multiple compound operations into a compound function, wherein the compound function is used to perform efficient hash table lookups in the block oriented processing system,
   wherein the compound function includes at least a first stage that checks if a hash table record and an input record are equal and a second stage that fetches data based on a result of the first stage.

2. The apparatus of claim 1, wherein the second stage fetches a next record in a hash table bucket-chain list for hash table records that failed in the first stage.

3. The apparatus of claim 1, wherein the second stage fetches attribute values for hash table records that passed in the first stage.

4. The apparatus of claim 1, wherein the block oriented processing system is a vectorized database system.

5. The apparatus of claim 1, wherein at least one of the multiple queries corresponds to a hash join operation on one or more tables of the database.

6. The method of claim 1, wherein the compound function is reused for multiple queries to perform the efficient hash table lookups in the block oriented processing system.

7. The apparatus of claim 6, further comprising a store that stores the compound function and allows the compound function to be reused for the multiple queries.

8. A method for hash table lookups in a block oriented processing system using just in time compiling of compound operations, the method comprising:
   performing block oriented processing of records on a database;
   just-in-time compiling, by a database engine associated with the database, multiple compound operations into a compound function, wherein the compound function is used to perform efficient hash table lookups in a the block oriented processing system,
   wherein the compound function includes at least a first stage that checks if a hash table record and an input record are equal and a second stage that fetches data based on a result of the first stage.

9. The method of claim 8, wherein the second stage fetches a next record in a hash table bucket-chain list for hash table records that failed in the first stage.

10. The method of claim 8, wherein the second stage fetches an attribute value in the database.

11. The method of claim 8, wherein the block oriented processing system is a vectorized database system.

12. The method of claim 8, wherein at least one of the multiple queries corresponds to a hash join operation on one or more tables of the database.

13. The method of claim 8, wherein the compound function is reused for multiple queries to perform the efficient hash table lookups in the block oriented processing system.

14. The method of claim 13, further comprising a store that stores the compound function and allows the compound function to be reused for the multiple queries.

* * * * *